J. B. Wood.
Telescope.

No. 44,057. Patented Aug. 30, 1864.

Witnesses
J. H. Phillips
Hartwell Locke

Inventor
J. B. Wood
by Joseph S. Kellogg
Atty

UNITED STATES PATENT OFFICE.

JOSHUA B. WOOD, OF NORWICH, NEW YORK.

IMPROVEMENT IN TELESCOPIC SIGHTS FOR RIFLES.

Specification forming part of Letters Patent No. 44,057, dated August 30, 1864.

*To all whom it may concern:*

Be it known that I, JOSHUA B. WOOD, of the town of Norwich, Chenango county, and State of New York, have invented a new Improved Telescopic Sight for Rifles and other Small-Arms; and I hereby declare that the following is a full and exact description thereof, reference being had to the accompanying drawings, and to the letters of reference being marked thereon.

Figure 1 represents the apparatus complete as attached to the tail-strap of a rifle, D representing the standard which operates in the tail-band in the ordinary way. Upon this standard, by means of the thumb-screw C, the telescope is raised or lowered at pleasure, while by means of the thumb-screw B a lateral or right-and-left motion of the telescope is secured, varying the sight in feet and inches, according to the proposed distance, by indicators $d$ and $e$, thus securing the desired range of the gun without actual experimenting, which is the distinguishing feature of my invention over all others now in use. $a\ a$ are spring-slides securing the telescope to the adjusting apparatus and rifle.

Figure 3:
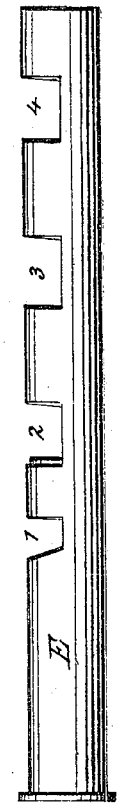
Fig. 3 is the tube designed to slide into the larger tube. (Represented in Fig. 2.) This tube is slotted as represented in the drawings at 1 2 3 4, for the purpose of allowing the glasses to be cleaned without their disturbance, this tube being held securely in the larger tube, Fig. 2, by the friction-spring F.
Figure 2:
Figure 5:
Figure 4:
Fig. 4 is the tube, split as represented at $f\ f\ f\ f$, for the purpose of holding itself to its place in the tube, in the manner of a spring.
Figure 1:
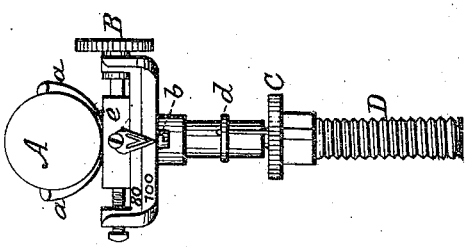

What I claim as new and original in my telescopic arrangement for rifles, and wish to secure by Letters Patent, is—

1. The rise-and-fall or up-and-down movement, also the lateral or right-and-left movement, combined together, forming a new arrangement and operating in harmony with each other, for the purposes set forth.

2. The slotted or notched tube E, for the purposes described.

JOSHUA B. WOOD.

Witnesses:
J. H. PHILLIPS,
GEO. C. LAMBRIGHT.